US012724472B2

(12) United States Patent
Sharma

(10) Patent No.: US 12,724,472 B2
(45) Date of Patent: Sep. 1, 2026

(54) ADAPTIVE BATTERY LEVEL-BASED CONTROL FOR AN ARTIFICIAL INTELLIGENCE (AI) SYSTEM

(71) Applicant: Microsoft Technology Licensing, LLC, Redmond, WA (US)

(72) Inventor: Mrinal Kumar Sharma, Noida (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 101 days.

(21) Appl. No.: 18/815,158

(22) Filed: Aug. 26, 2024

(65) Prior Publication Data

US 2026/0056595 A1 Feb. 26, 2026

(51) Int. Cl.
*G06F 1/32* (2019.01)
*G06F 1/3234* (2019.01)

(52) U.S. Cl.
CPC ................................. *G06F 1/3234* (2013.01)

(58) Field of Classification Search
CPC .................................................... G06F 1/3234
See application file for complete search history.

(56) References Cited

U.S. PATENT DOCUMENTS

2021/0056436 A1 2/2021 Shah
2021/0287142 A1* 9/2021 Ceulemans ........... G06F 21/566
2021/0325861 A1 10/2021 Hou
2022/0036123 A1 2/2022 Cummings
2022/0129057 A1 4/2022 Tsai
2023/0196207 A1 6/2023 Chakraborty

OTHER PUBLICATIONS

Liu, et al., "AdaSpring: Context-adaptive and Runtime-evolutionary Deep Model Compression for Mobile Applications", Association for Computing Machinery, vol. 5, Issue No. 1, Mar. 2021, pp. 24:1-24:22.

* cited by examiner

*Primary Examiner* — Stefan Stoynov
(74) *Attorney, Agent, or Firm* — NovoTechIP International PLLC

(57) ABSTRACT

An adaptive artificial intelligence (AI) control system receives a prompt for an AI system from a user interface component of a software application on a mobile device. The adaptive AI control system determines a current battery level of the mobile device using a battery level monitoring component. The adaptive AI control system then selects a generative AI model of the AI system to use to generate a response for the prompt based on the current battery level using a model selection component. The generative AI model that is selected is one of a plurality of different generative AI models of the AI system which are capable of processing the prompt, each of the plurality of generative AI models having a different level of complexity.

19 Claims, 8 Drawing Sheets

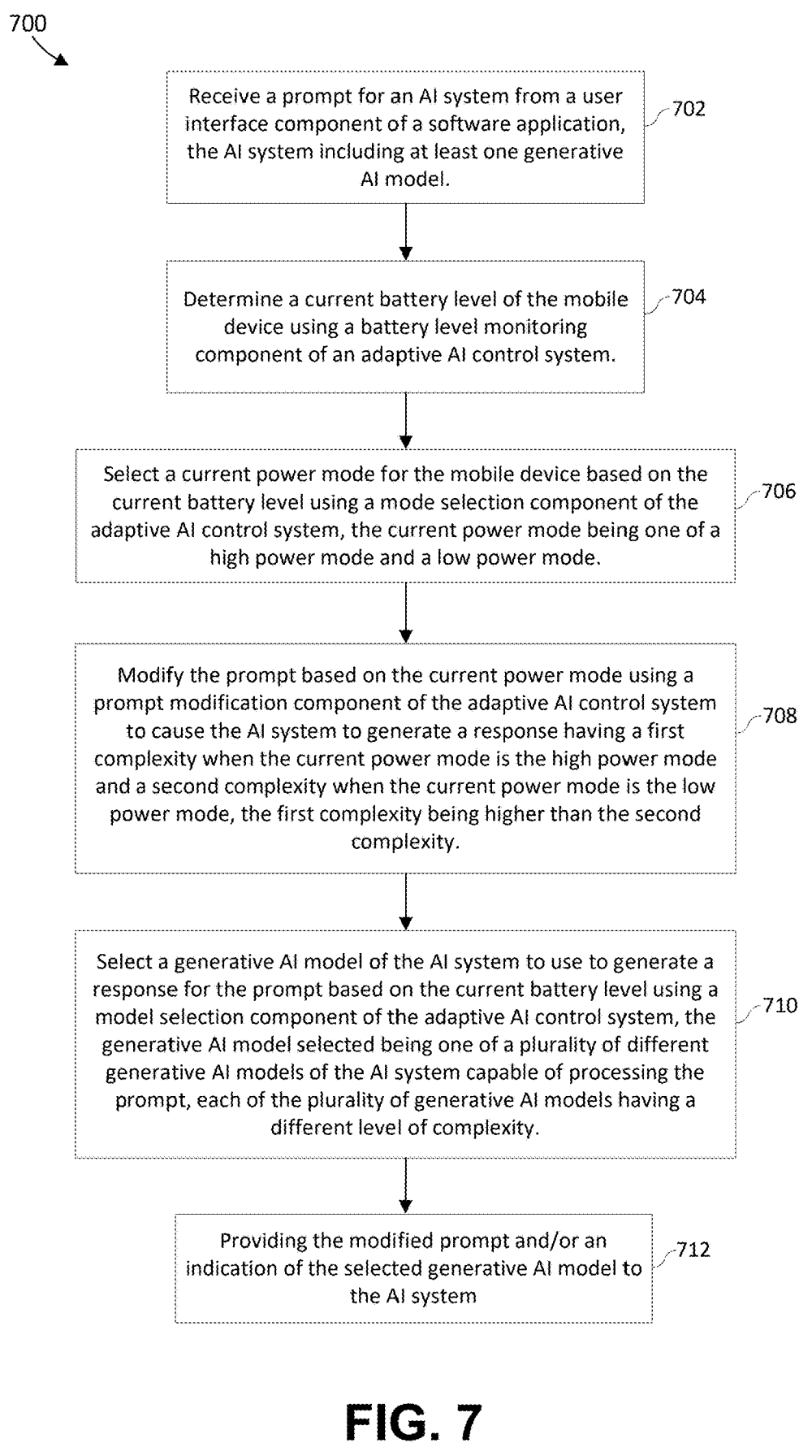

700

Receive a prompt for an AI system from a user interface component of a software application, the AI system including at least one generative AI model. 702

Determine a current battery level of the mobile device using a battery level monitoring component of an adaptive AI control system. 704

Select a current power mode for the mobile device based on the current battery level using a mode selection component of the adaptive AI control system, the current power mode being one of a high power mode and a low power mode. 706

Modify the prompt based on the current power mode using a prompt modification component of the adaptive AI control system to cause the AI system to generate a response having a first complexity when the current power mode is the high power mode and a second complexity when the current power mode is the low power mode, the first complexity being higher than the second complexity. 708

Select a generative AI model of the AI system to use to generate a response for the prompt based on the current battery level using a model selection component of the adaptive AI control system, the generative AI model selected being one of a plurality of different generative AI models of the AI system capable of processing the prompt, each of the plurality of generative AI models having a different level of complexity. 710

Providing the modified prompt and/or an indication of the selected generative AI model to the AI system 712

FIG. 7

ADAPTIVE BATTERY LEVEL-BASED CONTROL FOR AN ARTIFICIAL INTELLIGENCE (AI) SYSTEM

BACKGROUND

On-device artificial intelligence (AI) imposes substantial demands on the GPU, CPU and memory to enable the AI to learn and perform tasks in real-time. This is especially true for generative AI tasks, such as text and image generation. Running text generation models, such as Large Language Models (LLMS), and image generation models, such as DALL-E and Stable Diffusion, on mobile devices can be energy-intensive and drain battery life quickly. As a result, users may not be able to continue using certain AI features or take full advantage of advanced AI capabilities when battery levels are low. Various methods have been used in an effort to improve on-device AI battery usage in mobile devices. However, previously known methods typically focus on static or predefined optimizations for neural networks and primarily address computational load and efficiency without real-time battery level integration.

Hence, what is needed is a system and method for adapting generative AI performance that improves the efficiency of battery usage when performing generative AI tasks without negatively impacting user experience.

SUMMARY

In one general aspect, the instant disclosure presents a data processing system having a processor and a memory in communication with the processor wherein the memory stores executable instructions that, when executed by the processor alone or in combination with other processors, cause the data processing system to perform multiple functions. The functions include receiving a prompt for an AI system from a user interface component of a software application, the AI system including at least one generative AI model; determining a current battery level of the mobile device using a battery level monitoring component of an adaptive AI control system; selecting a current power mode for the mobile device based on the current battery level using a mode selection component of the adaptive AI control system, the current power mode being one of a first power mode and a second power mode, the second power mode being lower than the first power mode; modifying the prompt based on the current power mode using a prompt modification component of the adaptive AI control system, the prompt being modified to cause the AI system to generate a response to the prompt having a first complexity when the current power mode is the first power mode and a second complexity when the current power mode is the second power mode, the first complexity being higher than the second complexity; and providing the modified prompt to the AI system.

In yet another general aspect, the instant disclosure presents a method for adapting generative artificial intelligence (AI) performance to improve battery usage efficiency on a mobile device. The method includes receiving a prompt for an AI system from a user interface component of a software application, the AI system including at least one generative AI model; determining a current battery level of the mobile device using a battery level monitoring component of an adaptive AI control system; selecting a generative AI model of the AI system to use to generate a response for the prompt based on the current battery level using a model selection component of the adaptive AI control system, the generative AI model selected being one of a plurality of different generative AI models of the AI system capable of processing the prompt, each of the plurality of generative AI models having a different level of complexity; providing the prompt and an indication of the selected generative AI model to the AI system.

In a further general aspect, the instant application describes a non-transitory computer readable medium on which are stored instructions that when executed cause a programmable device to perform functions of receiving a prompt for an AI system from a user interface component of a software application on a mobile device, the AI system including at least one generative AI model; determining a current battery level of the mobile device using a battery level monitoring component of an adaptive AI control system; selecting a current power mode for the mobile device based on the current battery level using a mode selection component of the adaptive AI control system, the current power mode being one of a first power mode and a second power mode, the second power mode being lower than the first power mode; modifying the prompt based on the current power mode using a prompt modification component of the adaptive AI control system, the prompt being modified to cause the AI system to generate a response to the prompt having a first complexity when the current power mode is the first power mode and a second complexity when the current power mode is the second power mode, the first complexity being higher than the second complexity; selecting a generative AI model of the AI system to use to generate a response for the prompt based on the current battery level using a model selection component of the adaptive AI control system, the generative AI model selected being one of a plurality of different generative AI models of the AI system capable of processing the prompt, each of the plurality of generative AI models having a different level of complexity; and providing the prompt and an indication of the selected generative AI model to the AI system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 7 is a flow diagram showing an example method for providing battery level based adaptation of an AI system.

DETAILED DESCRIPTION

Figure 1:
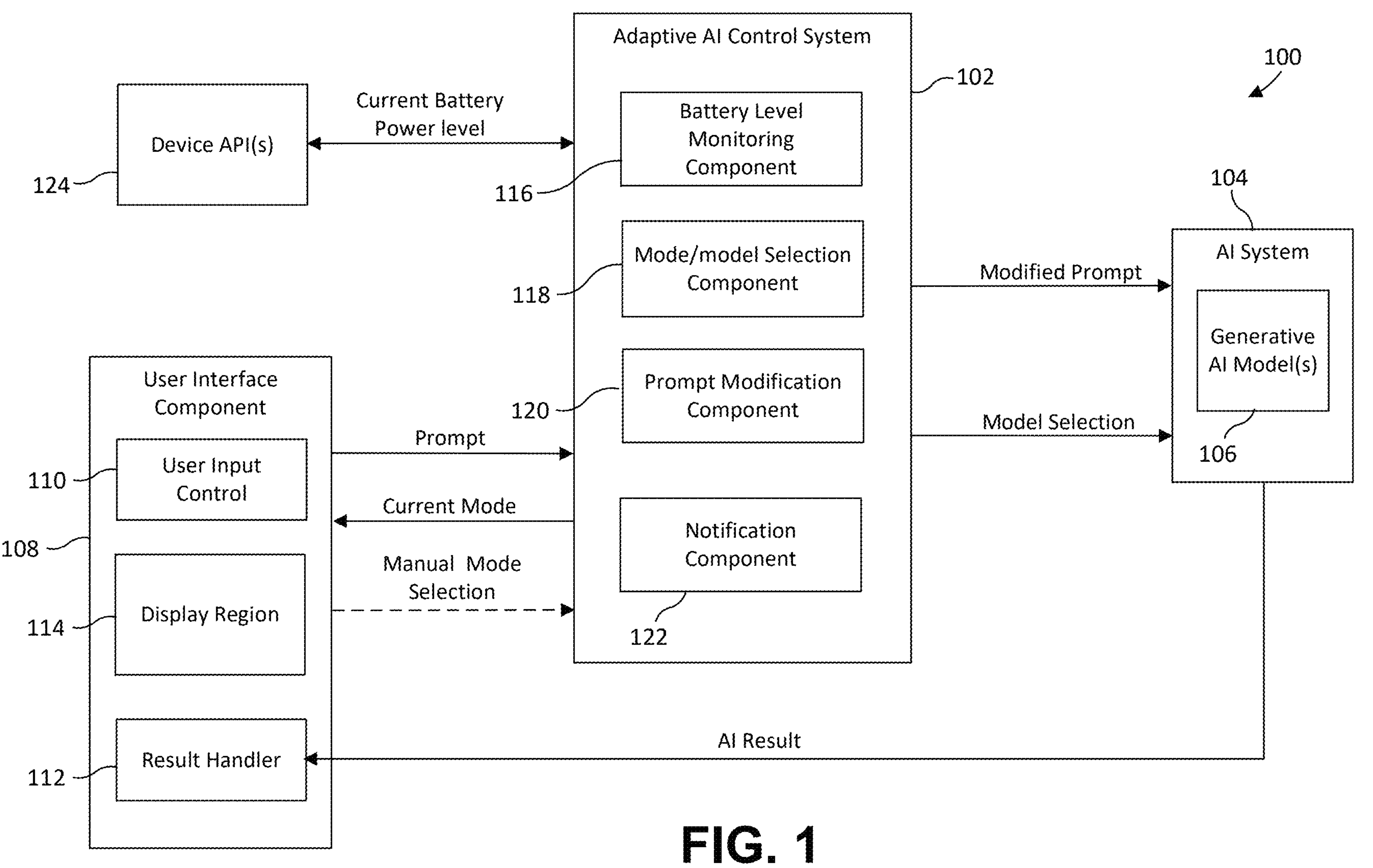
FIG. 1 depicts an example on-device computing environment upon which aspects of this disclosure may be implemented.

On-device artificial intelligence (AI) refers to the capability of devices to perform AI tasks, such as processing and learning, directly on the device itself rather than relying on data transmission to and from cloud-based servers. This form of AI utilizes the processing power of the device's hardware, such as CPUs, GPUs, or specialized chips like neural processing units (NPUs), to run AI algorithms locally. On-device AI provides a host of benefits from cost, accessibility, flexibility, privacy, and reduced latency. As a result, many applications are turning to on-device AI to enhance application performance and improve user experiences.

However, on-device AI imposes substantial demands on the GPU, CPU and memory to enable the AI on the devices to learn and perform tasks in real-time. This is especially true for generative AI tasks, such as text and image generation. Running text generation models, such as Large Language Models (LLMS), and image generation models, such as DALL-E and Stable Diffusion, on mobile devices can be energy-intensive and drain battery life quickly. As a result, users may not be able to continue using certain AI features or take full advantage of advanced AI capabilities when battery levels are low.

Various methods have been used in an effort to improve on-device AI battery usage in mobile devices. However, previously known methods typically focus on static or predefined optimizations for neural networks and primarily address computational load and efficiency without real-time battery level integration. These methods often rely on offline training or require significant overhead for adaptive changes. In addition, most current AI systems use a single model irrespective of the device's battery level which severely limits the ability of the AI system to be adapted to varying circumstances. Some applications, such as streaming services, reduce quality in order to reduce computational load. However, these applications do not change the underlying model or processing complexity which results in less effective power conservation.

To address the technical problems associated with improving battery usage on mobile devices while performing generative AI tasks, this description provides technical solutions in the form an adaptive AI control system that that monitors the battery level of a mobile device and adjusts the complexity of AI-driven tasks, such as image generation and text summarization, based on the battery level. The complexity of AI-driven tasks can be adjusted by switching between generative AI models of different complexity based on the current battery level and/or by modifying the prompt provided to a generative AI model to cause the model to generate more complex or less complex output based on the current battery level. For example, when the battery level is high (e.g., above a predetermined battery level threshold), the system can use more resource-intensive generative AI models and/or can modify the prompt for a generative AI model to cause the model to generate more complex, higher quality output. Conversely, when the battery is low, the system can switch to simpler, less power-consuming models to conserve energy and/or can modify the prompt to cause the model to generate simpler, lower quality output. This adaptive approach ensures efficient use of computational resources and battery conservation. This approach also allows users to continue utilizing essential features when battery levels are low, while taking full advantage of advanced capabilities when the battery is adequately charged, thus providing users with a seamless experience regardless of their device's battery status.

The technical solution integrates two main functionalities, text summarization and image generation, each capable of operating in at least a high power mode and a low power mode. This multi-mode operation is tailored to adapt based on the real-time battery level, ensuring that users can still perform essential tasks even when their device is low on power. Users can therefore maintain productivity and enjoy continuous access to essential AI capabilities without significant interruptions or concerns about battery drain. Multiple generative AI models of different complexities are preloaded on the device which enables smooth transitions between models without noticeable delays or performance drops. Battery level is continuously monitored. The system can switch between models of different complexity and/or generate prompts for causing a model to generate outputs of different complexity based on a comparison of the current battery level with a predefined battery level threshold.

The technical solutions described herein address the problems related to battery usage when performing generative AI tasks using on-device AI. The technical solutions integrate battery level detection with adaptive AI model complexity for specific tasks, providing a comprehensive, user-centric approach to battery and performance optimization. This innovation goes beyond existing methods by offering real-time, granular adjustments, empowering user control, and ensuring seamless operation across multiple applications.

FIG. 1 illustrates an example computing environment 100 in which a battery level-based adaptive AI control system 102 in accordance with this disclosure may be implemented. Computing environment 100 also includes an AI system 104, such as a digital assistant system, which is configured to perform various tasks or services in response to receiving prompts from users of a mobile device, such as a smartphone, tablet, and the like. The term "prompt" refers to natural language text which defines at least one query or instruction which is used by generative AI as the basis for generating a response. The AI system 104 is capable of performing various tasks in response to prompts, such as providing assistance in writing documents, letters, emails, and the like, researching topics, organizing information, planning tasks, and managing projects. To this end, the AI system 104 includes one or more generative AI models 160 trained to generate new content, including text and images. Examples of text generative AI models that can be used in the AI system include Large Language Models (LLMs) such as GPT-3, GPT-4, ChatGPT, and the like. Examples of image generative AI models that can be used in the AI system include DALL-E, Stable Diffusion, and LLMs with vision, such as GPT-4V. In some implementations, the AI system can include one or more multimodal large language models (MLLMs) for generating new text and/or image content.

In various implementations, to enable adaptive generative AI performance based on battery power levels, the AI system 104 includes different generative AI models 106 having different levels of complexity for performing text generating and image generating tasks in different power modes. As noted above, the adaptive AI control system provides at least a high power mode and a low power mode of operation for the mobile device. To enable a high power mode and a low power mode for text generating tasks on the mobile device, the AI system 104 can include at least one text generative model for generating text in the high power mode and at least one text generative model for generating text in the low power mode. More complex generative AI models can be used in high power mode (e.g., when the battery power level is above a predetermined threshold) to maximize performance for users. Simpler generative AI models which require less computational power and produce basic but functional outputs are used for the low power mode in order to conserve battery power so that a consistent level of service and user experience can be maintained without interruptions. To improve performance, both complex and simple models can be pre-loaded on the device to ensure smooth transitions without noticeable delays or performance drops when switching between power modes.

Figure 2:
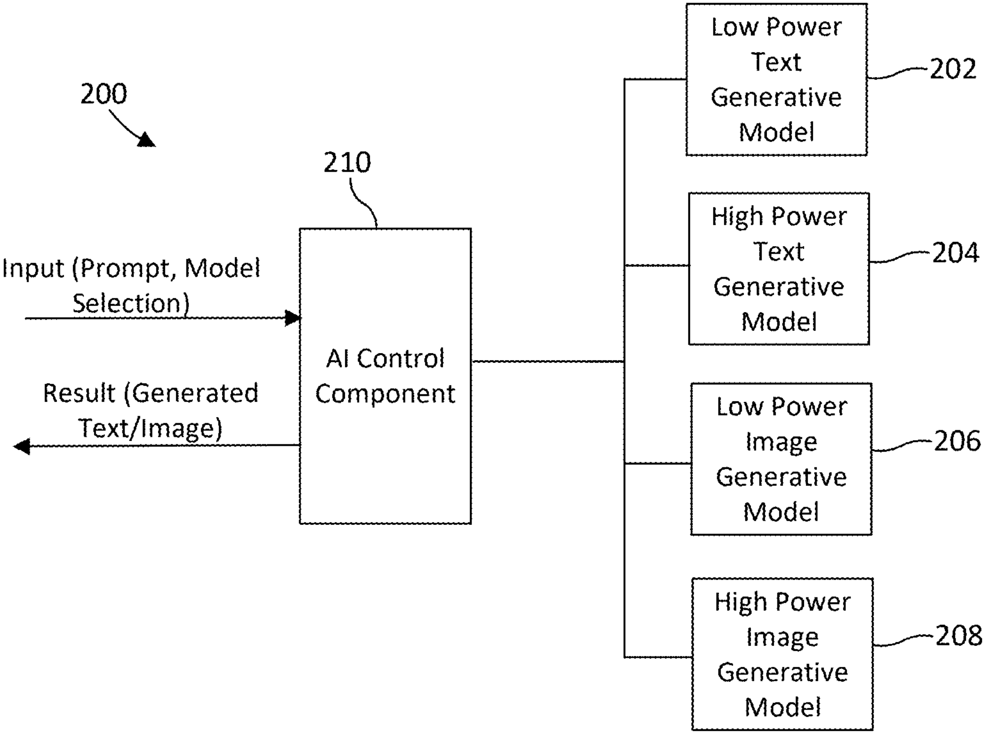
FIG. 2 depicts an example implementation of the AI system of FIG. 1.

Multiple generative AI models of varying complexities can be utilized in the AI system for performing different generative tasks, such as text generation (e.g., stories), summarization, image generation, and the like. An example implementation of an AI system 200 having multiple generative AI models for performing text generating and image generating tasks is shown in FIG. 2. The AI system 200 includes a low power text generative model 202 and a high power text generative model 204 for performing text generating tasks while in low power mode and high power mode, respectively. The AI system 200 includes a low power image generative model 206 and a high power image generative model 208 for performing image generating tasks while in low power mode and high power mode, respectively. The AI system 200 includes an AI control component 210 which receives input from the adaptive AI control system 102 which includes the prompt and model selection information which indicates which model to use in generating a response to the prompt. The AI control component 210 then provides the prompt to the appropriate model.

As an alternative to or in addition to the use of generative AI with different levels of complexity to implement different power modes, the power modes can be implemented through the use of prompt engineering. For example, a low power mode can be implemented at least in part by modifying the prompt which is provided to the generative AI so that the output is generated with different levels of complexity. For example, for text summarization tasks, the prompt can be modified to request abstractive summaries which are more complex and computationally intensive when operating in high power mode and to request extractive summaries which are simpler and less computationally intensive to produce while in low power mode. Similarly, when generating images, prompts can be modified to request higher resolution images when in high power mode and lower resolution images when in low power mode. Although the adaptive AI control system and AI system have been described as having only a high power mode and a low power mode, the systems can be adapted to operate in more than two power modes. Multiple battery level thresholds can be defined to differentiate between any number of power modes.

The AI system 104 receives prompts from a user interface component 108. As shown in FIG. 1, the user interface component 108 includes a user input control 110 for receiving prompts from users in the form of natural language text defines one or more queries, instructions, requests for assistance, and the like for the AI system. User input may be provided via a user input device, such as a keyboard, touch input, voice input, and the like. The user interface component 108 also includes a result handler 112 and a display region 114. The result handler 112 receives the results generated by the AI system 104 in response to prompt and causes the results to be displayed in the display region 114 of the user interface component. In various implementations, user input for a prompt is collected until a sequence termination command is detected. The sequence termination command can be generated in response to activation of a send button or other UI control, or in response to receiving a predetermined keystroke or combination of keystrokes, such as hitting a TAB or Enter key on a keyboard. Once the sequence termination command is detected, the user interface component sends the prompt to the adaptive AI control system 102.

The adaptive AI control system 102 includes a battery power monitoring component 116, a mode/model selection component 118, a prompt modification component 120, and a notification component 122. The battery level monitoring component 116 monitors the current battery power level of the mobile device. The battery level monitoring component 116 can determine current battery levels in any suitable manner. In some implementations, the battery power monitoring component 116 uses one or more predefined device Application Programming Interfaces (APIs) 124 to continuously track battery levels. In other implementations, the battery power monitoring component can be programmed to communicate directly with the battery control system and/or to access stored battery level values device memory to determine current battery levels. The battery level monitoring component 116 communicates and/or provides access to the current battery level to the mode/model selection component 118. For example, in some implementations, the battery level monitoring component 116 stores the current battery level in a predetermined memory location. In other implementations, the battery level monitoring component communicates the current battery level to the mode/model selection component in response to receiving a predetermined signal or the like.

Figure 3A:
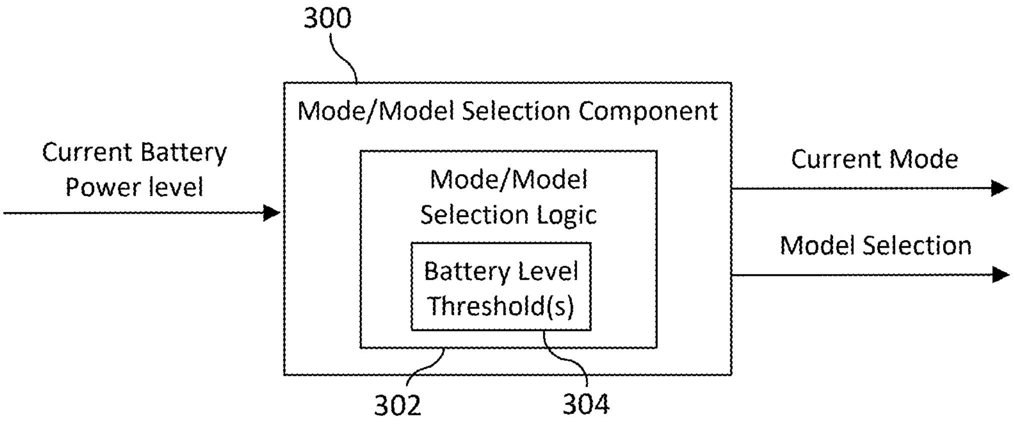
FIG. 3A depicts an example implementation of the mode/model selection component of the adaptive AI control system of FIG. 1.
Figure 3B:
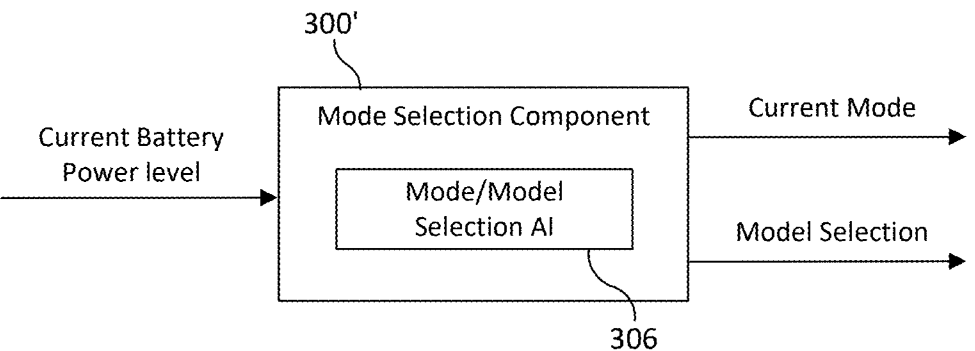
FIG. 3B depicts another example implementation of the mode/model selection component of the adaptive AI control system of FIG. 1.

When a prompt is received, the mode/model selection component 118 identifies the current battery level and selects the current mode of operation (e.g., high power mode or low power mode) and/or the model to use based on the current battery level. The mode/model selection component 118 can determine the current mode of operation based on the current battery level in any suitable manner. FIG. 3A shows an example implementations of a mode/model selection component 300 that uses mode/model selection logic 302 to select the current mode and the model for generating the response to the prompt. The mode/model selection logic 302 compares the current battery level to one or more predefined battery level threshold values 304 and outputs a current mode and a model selection based on the comparison. For example, when the current battery level exceeds a predefined battery level threshold, the current mode corresponds to the high power mode and the model selection corresponds to a high power model. FIG. 3B shows another example implementation of a mode/model selection component 300'. In the example of FIG. 3B, the mode/model selection component 300'includes a mode/model selection AI 306 which is trained to determine a current mode of operation and/or a model for the AI system to use based on the current battery level.

Figure 4:
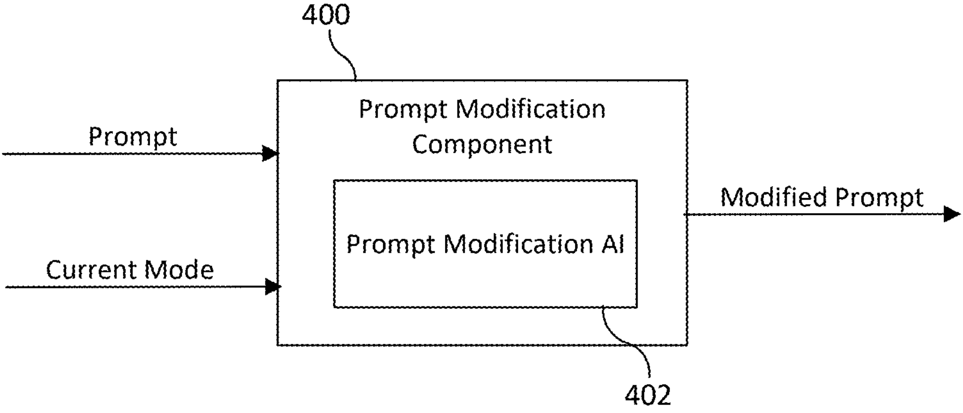
FIG. 4 depicts an example implementation of the prompt modification component of the adaptive AI control system of FIG. 1.

The current mode selected by the mode/model selection component 118 is provided to the prompt modification component 120 along with the prompt. The prompt modification component then modifies the prompt based on the current mode. An example implementation of a prompt modification component 400 is shown in FIG. 4. The prompt modification component 400 includes prompt modification AI 402 for generating modified prompts for the AI system. The prompt modification AI 402 receives the prompt and the current mode of operation of the device and is trained to modify the prompt in a manner that is appropriate for the current mode. For example, when in high power mode, the prompt modification AI 402 can generate the prompt with instructions for causing the AI system to generate outputs that are highly detailed and have complex characteristics, and, when in low power mode, the prompt modification AI 402 can generate the prompt with instructions for causing the AI system to generate outputs with less detail and simple characteristics.

For example, take the following prompt: "Generate an image of a forest during sunrise. The forest has ancient trees, a clear stream running through the middle, and magical creatures like fairies and unicorns." When the current mode is high power mode, the prompt modification component can modify the prompt by including instructions for generating a high-resolution, richly-detailed image. For example, given the above prompt, the prompt modification component can generate a prompt for high power mode that reads as follows: "Generate a high-resolution image of a lush, enchanted forest during sunrise. Include ancient trees with sprawling roots, a crystal-clear stream running through the middle, and magical creatures like fairies and unicorns. Use a fantasy art style with rich colors and intricate details." When the current mode is low power mode, the prompt modification component can modify the prompt by including instructions for generating a low-resolution image with fewer details and using a minimalistic style (e.g., soft colors and basic shapes) which still conveys the enchanted forest theme but with less visual richness. For example, given the above prompt, the prompt modification component can generate a prompt for low power mode that reads as follows: "Create a simple image of an enchanted forest during sunrise. Include some trees, a stream, and a few magical creatures like fairies. Use a minimalist fantasy art style with basic shapes and soft colors."

As another example, when the device is in high power mode, the prompt modification component can generate a prompt for causing the AI system to generate an image of a space exploration scene that reads as follows: "Generate a high-resolution image of an astronaut exploring the surface of Mars. Include detailed Martian landscapes with red rocks, mountains, and a clear view of the Earth in the distant sky. The astronaut's suit should have intricate details and NASA logos. Use a realistic art style with sharp details and vibrant colors." Conversely, when the device is in low power mode, the prompt modification component can generate a prompt that reads as follows: "Create a simple image of a castle on a cliff. Include basic elements like towers and a forest. Use a minimalist art style with basic shapes and soft colors."

When the prompt is for summarizing a scientific article on quantum computing, the prompt modification component can generate a prompt when the device is in high power that reads as follows: "Summarize this scientific article on quantum computing, highlighting the key breakthroughs, methodologies, and future implications. Ensure the summary is detailed and covers all major aspects." In low power mode, the prompt modification component can generate a prompt for summarizing the same article that reads as follows: "Summarize this scientific article on quantum computing with the main points only." When the prompt is for text generation (e.g., writing a story), the prompt modification component can generate a prompt when the device is in high power that reads as follows: "Write a detailed story set in a medieval fantasy world. Include rich descriptions of the environment, complex character development, and an intricate plot with multiple subplots." When the device is in low power mode, the prompt modification component can generate a prompt that reads as follows: "Write a short story set in a medieval fantasy world with basic descriptions and a simple plot."

Returning to FIG. 1, the modified prompt and the model selection are provided to the AI system 104. The AI system provides the prompt to the selected model which generates a result (e.g., text and/or image) based on the prompt. The result is returned to the result handler 112 of the user interface component 108 which causes the result to be displayed in the display region 114. The notification component 122 provides a notification to the user interface component 108 that indicates the current mode for the device (e.g., "Low power mode active"). In some implementations, the notification component 122 can be used to notify the user that they can select a desired mode of operation that can override the current mode selected by the system. For example, if the system indicates that the low power mode is active, the user can manually select a mode of operation via the user interface component.

Figure 5:
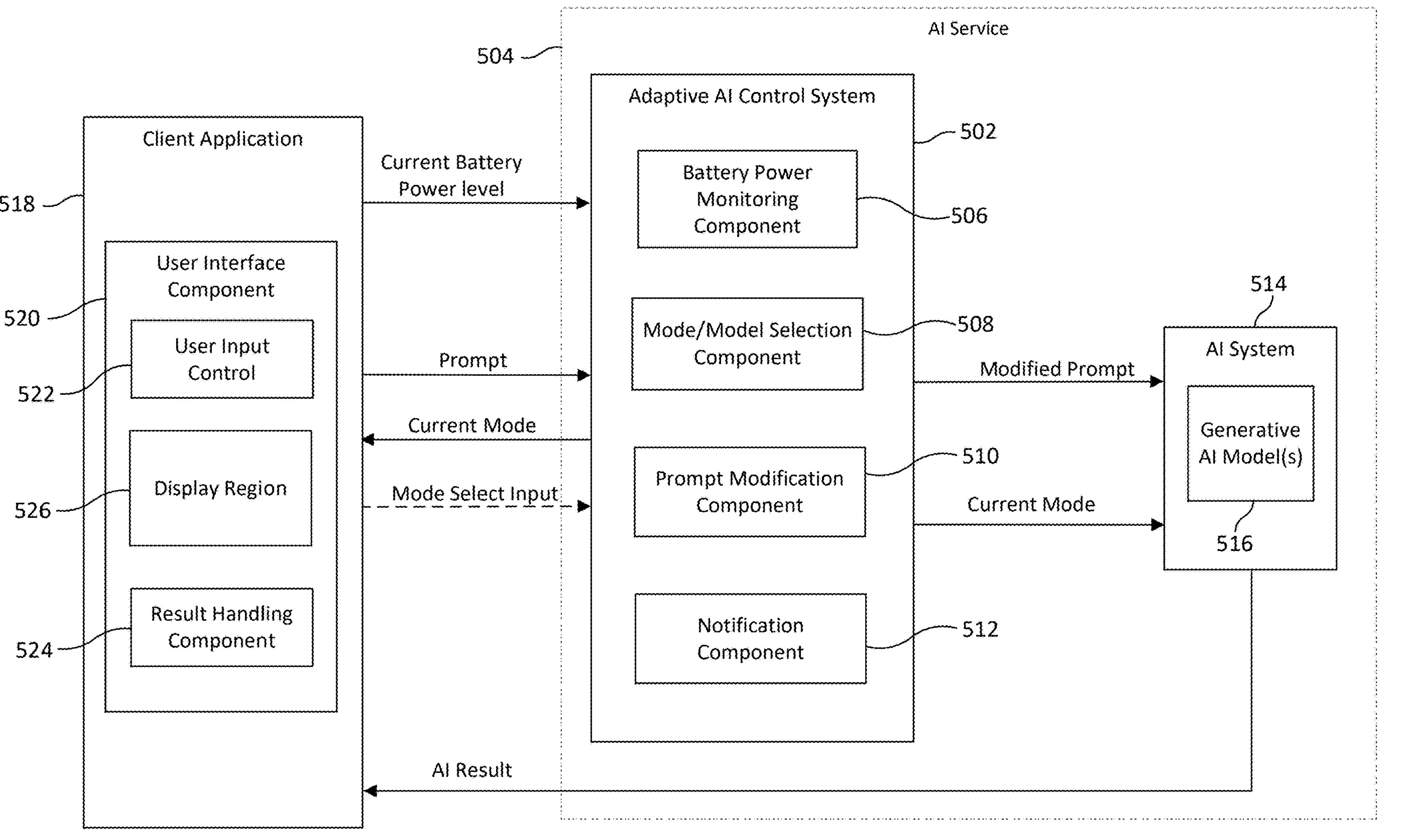
FIG. 5 depicts an example implementation of a cloud-based adaptive AI control system.

The adaptive AI control system can be utilized for on-device AI systems and for cloud-based AI systems. The computing environment 100 of FIG. 1 shows an on-device implementation of an adaptive AI control system. In FIG. 1, adaptive AI control system 102, user interface component 108, and AI system 104 are all installed and executed on a mobile device. FIG. 5 shows an example 500 of a cloud-based implementation of an adaptive AI control system. In the example of FIG. 5, the adaptive AI control system 502 is implemented as part of an AI service 504. The adaptive AI control system 502 includes a battery power monitoring component 506, mode/model selection component 508, a prompt modification component 510, and a notification component 512. The AI service 504 includes an AI system 514 which includes one or more generative AI models 516 for generating responses to prompts received from users. In FIG. 5, prompts are received from client applications 518. Client applications 518 include a user interface component 520 which has a user input control 522 for receiving prompts, a result handling component 524 for handling results received from the AI service 504, and a display region 526 for displaying the results. The components shown in FIG. 5 operate in substantially the same manner is the corresponding components in FIG. 1.

Figure 6:
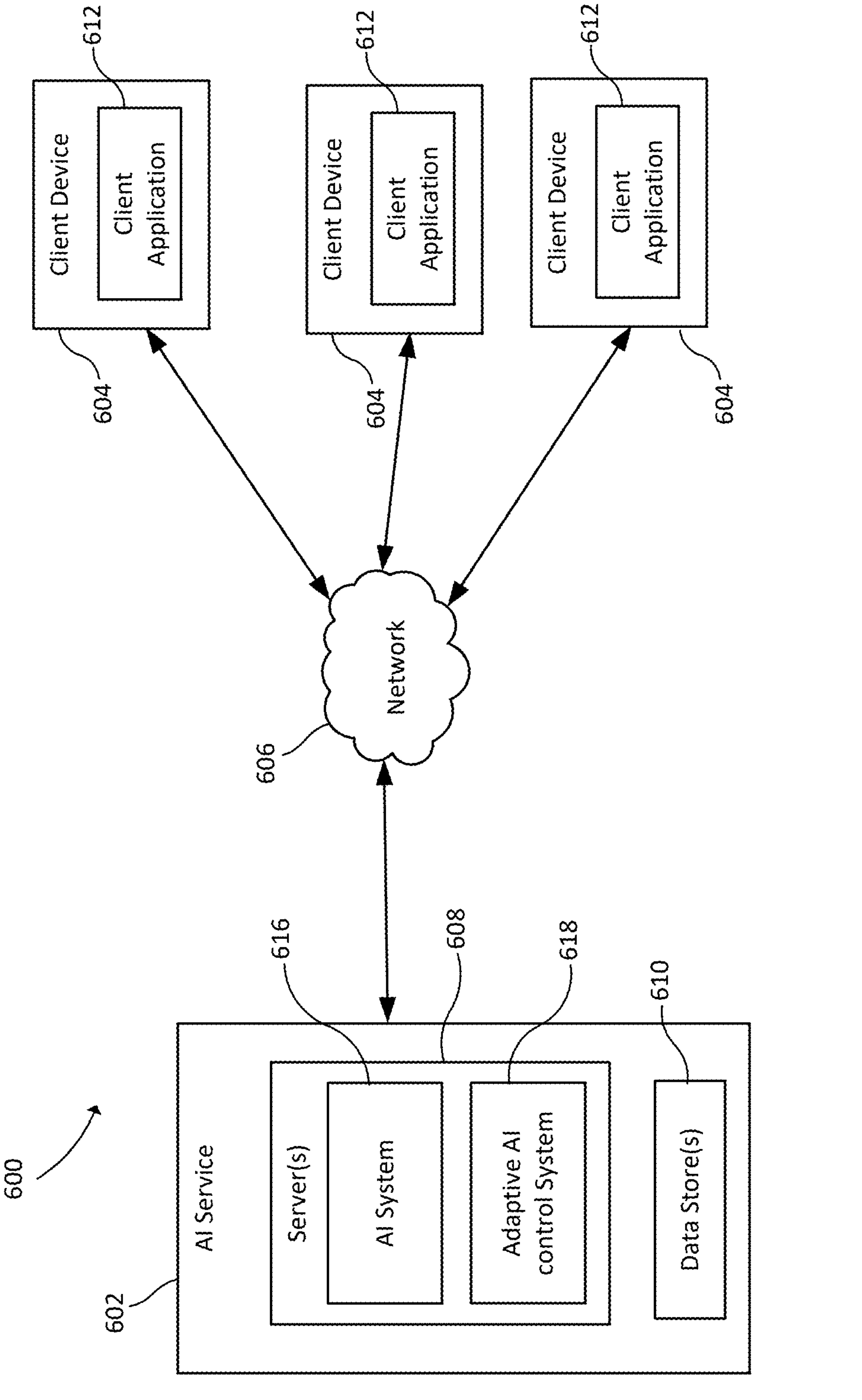
FIG. 6 depicts an example of a cloud-based computing environment in which the adaptive AI control system of FIG. 5 may be implemented.

FIG. 6 shows an example computing environment 600 in which a cloud-based adaptive AI control system is implemented. The computing environment 600 includes an AI service 602 and client devices 604 which communicate with each other via a network 606. The network 606 includes one or more wired, wireless, and/or a combination of wired and wireless networks. In some implementations, the network 606 includes one or more local area networks (LAN), wide area networks (WAN) (e.g., the Internet), public networks, private networks, virtual networks, mesh networks, peer-to-peer networks, and/or other interconnected data paths across which multiple devices may communicate. In some examples, the network 606 is coupled to or includes portions of a telecommunications network for sending data in a variety of different communication protocols. In some implementations, the network 606 includes Bluetooth® communication networks or a cellular communications network for sending and receiving data including via short messaging service (SMS), multimedia messaging service (MMS), hypertext transfer protocol (HTTP), direct data connection, WAP, email, and the like.

The AI service 602 may be implemented as a cloud-based service or set of services. To this end, AI service 602 includes an AI system 616 and an adaptive AI control system 618 (such as shown in FIG. 5) for providing battery-level based adaptation of the AI services to clients. The AI system 616 and adaptive AI control system 618 are implemented on one or more servers 608 which are configured to provide computational and/or storage resources for implementing the AI service 602. Server 608 is representative of any physical or virtual computing system, device, or collection thereof, such as, a web server, rack server, blade server, virtual machine server, or tower server, as well as any other type of computing system used to implement the AI service 602. In some implementations, server 608 is implemented in a data center, a virtual data center, or some other suitable facility. Server 608 executes one or more software applications, modules, components, or collection thereof capable of implementing the AI system 616 and adaptive AI control system 618. In various implementations, server 608 hosts data and/or content in connection with the AI system 616 and adaptive AI control system 618 and makes this data and/or content available to the users of client devices 604 via the network 606. Program code, instructions, user data and/or content for the AI system 616 and adaptive AI control system 618 is stored in one or more data stores 610.

Client devices 604 enable users to access services and/or applications offered by the AI service 602. The client devices 604 may include any suitable type of computing device, such as personal computers, desktop computers, laptop computers, mobile telephones, smart phones, tablets, phablets, smart watches, wearable computers, gaming devices/computers, televisions, and the like. Each client device 604 includes at least one client application 612 that is executed on the client device 604 for interacting with the AI service 602. In some implementations, the client application 612 is a local content editing application, such as a word processor, spreadsheet application, presentation authoring application, email client, and/or the like, that is capable of communicating and interact with the AI service 602. In other implementations, the client application 612 is a web browser that enables access to web-based application(s) implemented by the AI service 602.

FIG. 7 shows a flowchart of an example method 700 for adapting generative artificial intelligence (AI) performance to improve battery usage efficiency on a mobile device. The method begins with receiving a prompt for an AI system from a user interface component of a software application (block 702). A current battery level of the mobile device is determined using a battery level monitoring component of an adaptive AI control system (block 704). A current power mode for the mobile device is selected based on the current battery level using a mode selection component of the adaptive AI control system, the current power mode being one of a high power mode and a low power mode (block 706). The prompt is then modified based on the current power mode using a prompt modification component of the adaptive AI control system. The modification is used to cause the AI system to generate a response having a first complexity when the current power mode is the high power mode and a second complexity when the current power mode is the low power mode, the first complexity being higher than the second complexity (block 708). In addition to or as an alternative to modifying the prompt, a generative AI model of the AI system is selected to use to generate a response for the prompt based on the current battery level using a model selection component of the adaptive AI control system. The generative AI model that is selected is one of a plurality of different generative AI models of the AI system capable of processing the prompt, each of the plurality of generative AI models having a different level of complexity (block 710). The modified prompt and/or an indication of the selected generative AI model is then provided to the AI system (block 712).

Figure 8:
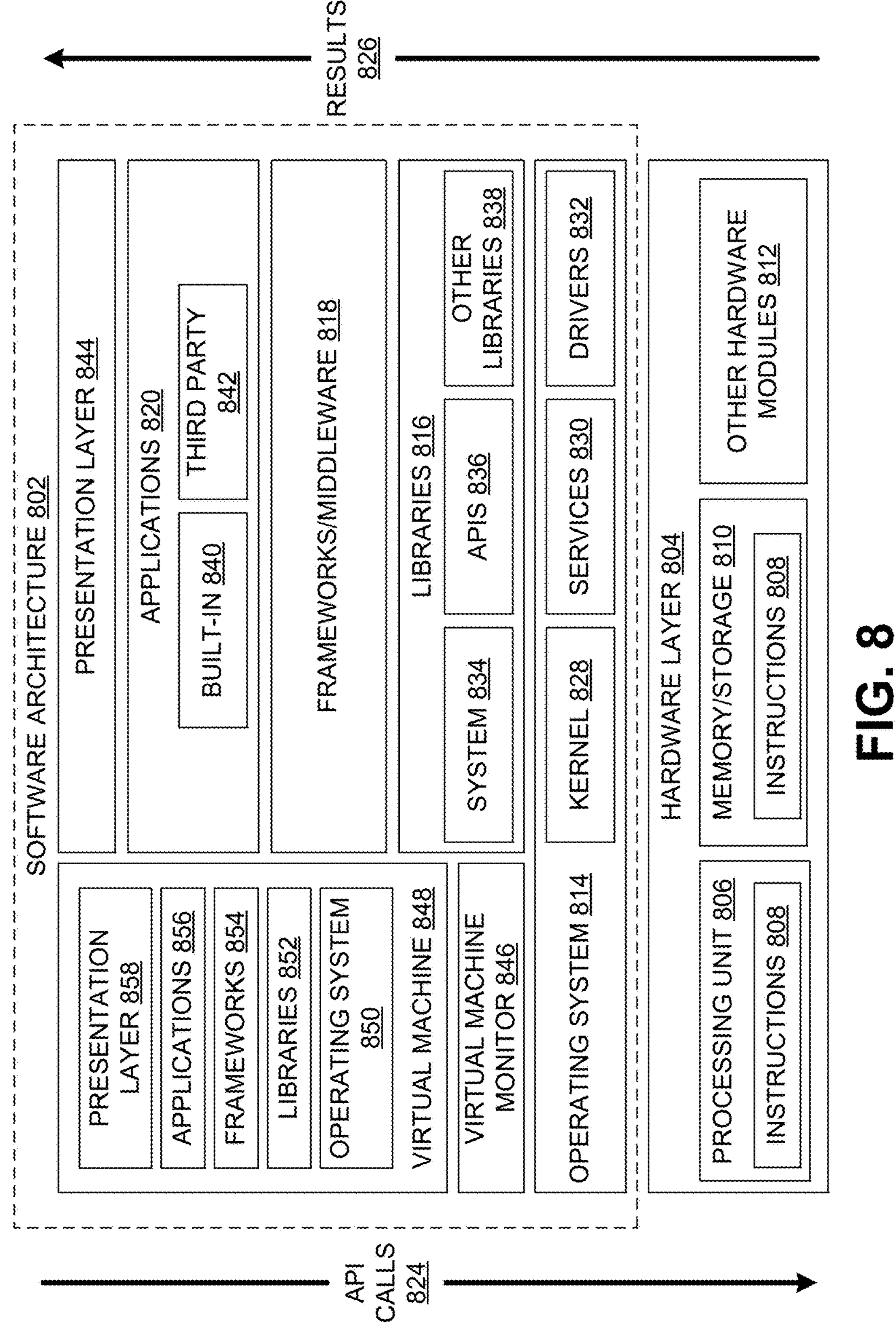
FIG. 8 is a block diagram of an example computing device, which may be used to provide implementations of the mechanisms described herein.

FIG. 8 is a block diagram 800 illustrating an example software architecture 802, various portions of which may be used in conjunction with various hardware architectures herein described, which may implement any of the above-described features. FIG. 8 is a non-limiting example of a software architecture, and it will be appreciated that many other architectures may be implemented to facilitate the functionality described herein. The software architecture 802 may execute on hardware such as a machine 900 of FIG. 9 that includes, among other things, processors 910, memory 930, and input/output (I/O) components 950. A representative hardware layer 804 is illustrated and can represent, for example, the machine 900 of FIG. 9. The representative hardware layer 804 includes a processing unit 806 and associated executable instructions 808. The executable instructions 808 represent executable instructions of the software architecture 802, including implementation of the methods, modules and so forth described herein. The hardware layer 804 also includes a memory/storage 810, which also includes the executable instructions 808 and accompanying data. The hardware layer 804 may also include other hardware modules 812. Instructions 808 held by processing unit 806 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 844. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various graphic user interface (GUI) functions, high-level resource management, or high-level location services. The frameworks 818 may provide a broad spectrum of other APIs for applications 820 and/or other software modules.

The applications 820 include built-in applications 840 and/or third-party applications 842. Examples of built-in applications 840 may include, but are not limited to, a contacts application, a browser application, a location application, a media application, a messaging application, and/or a game application. Third-party applications 842 may include any applications developed by an entity other than the vendor of the particular platform. The applications 820 may use functions available via OS 814, libraries 816, frameworks 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine (such as the machine 900 of FIG. 9, for example). The virtual machine 848 may be hosted by a host OS (for example, OS 814) or hypervisor, and may have a virtual machine monitor 846 which manages operation of the virtual machine 848 and interoperation with the host operating system. A software architecture, which may be different from software architecture 802 outside of the virtual machine, executes within the virtual machine 848 such as an OS 850, libraries 852, frameworks 854, applications 856, and/or a presentation layer 858.

Figure 9:
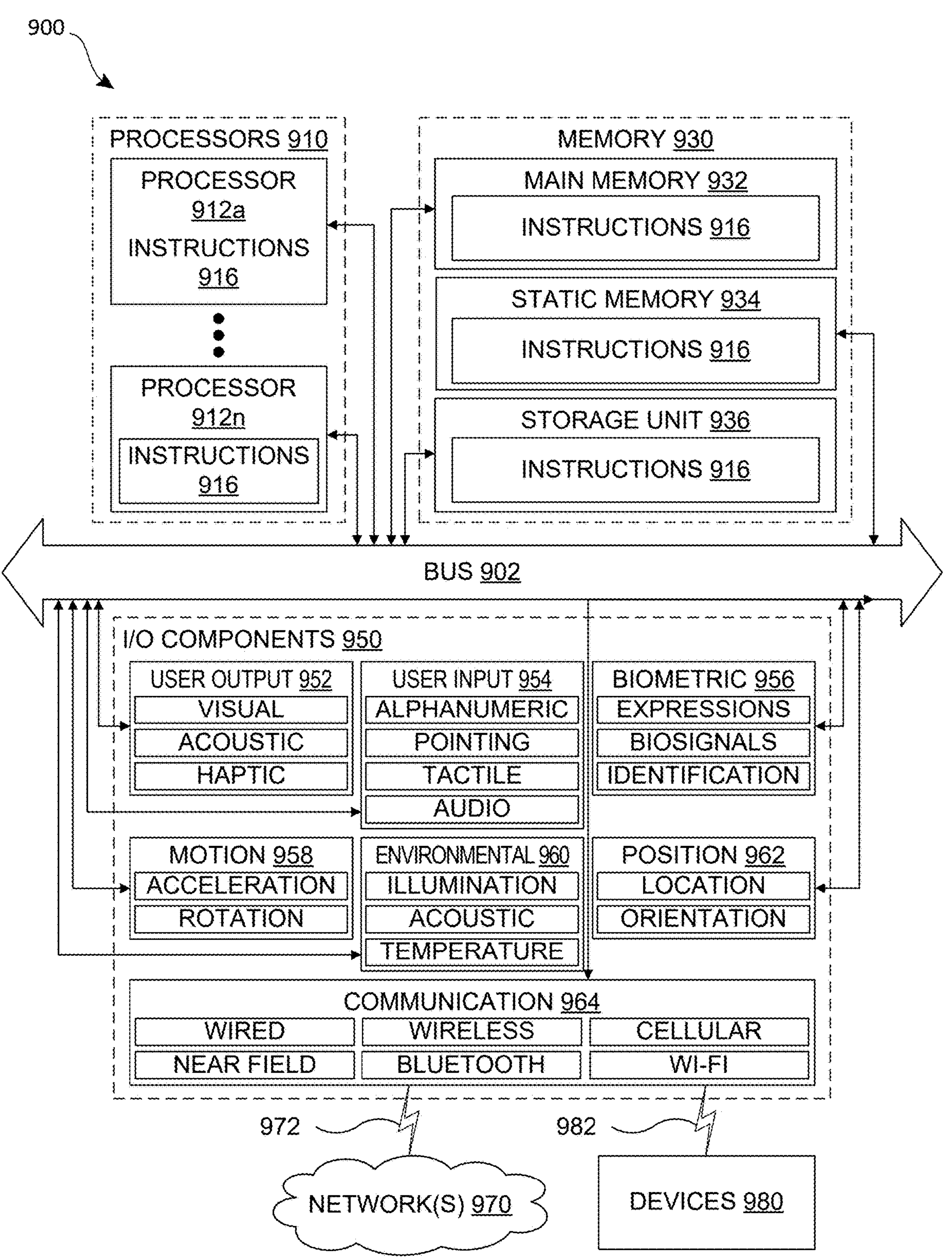
FIG. 9 is a block diagram illustrating components of an example machine configured to read instructions from a machine-readable medium.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement modules or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The machine 900 may include processors 910, memory 930, and I/O components 950, which may be communicatively coupled via, for example, a bus 902. The bus 902 may include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) may include one or more processors **912*a* to 912*n* that may execute the instructions 916 and process data. In some examples, one or more processors 910 may execute instructions provided or identified by one or more other processors 910. The term "processor" includes a multi-core processor including cores that may execute instructions contemporaneously. Although FIG. 9 shows multiple processors, the machine 900 may include a single processor with a single core, a single processor with multiple cores (for example, a multi-core processor), multiple processors each with a single core, multiple processors each with multiple cores, or any combination thereof. In some examples, the machine 900** may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956, motion components 958, environmental components 960, and/or position components 962, among a wide array of other physical sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 958 may include, for example, acceleration sensors (for example, an accelerometer) and rotation sensors (for example, a gyroscope). The environmental components 960 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 962 may include, for example, location sensors (for example, a Global Position System (GPS) receiver), altitude sensors (for example, an air pressure sensor from which altitude may be derived), and/or orientation sensors (for example, magnetometers).

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 964, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article or apparatus are capable of performing all of the recited functions.

What is claimed is:

1. A data processing system for adapting generative artificial intelligence (AI) performance to improve battery usage efficiency on a mobile device, the system comprising:
- a processor; and
- a memory in communication with the processor, the memory comprising executable instructions that, when executed by the processor alone or in combination with other processors, cause the data processing system to perform functions of:
  - receiving a prompt for an AI system from a user interface component of a software application, the AI system including at least one generative AI model;
  - determining a current battery level of the mobile device using a battery level monitoring component of an adaptive AI control system;
  - selecting a current power mode for the mobile device based on the current battery level using a mode selection component of the adaptive AI control system, the current power mode being one of a first power mode and a second power mode, the second power mode being lower than the first power mode;
  - modifying the prompt based on the current power mode using a prompt modification component of the adaptive AI control system, the prompt being modified to cause the AI system to generate a response to the prompt having a first complexity when the current power mode is the first power mode and a second complexity when the current power mode is the second power mode, the first complexity being higher than the second complexity; and
  - providing the modified prompt to the AI system.

2. The data processing system of claim 1, wherein to determine the current battery level the memory further includes executable instructions that cause the data processing system to perform a function of:
- using an Application Programming Interface (API) of the mobile device to monitor the current battery level of the mobile device.

3. The data processing system of claim 1, wherein to select the current power mode for the memory further includes executable instructions that cause the data processing system to perform functions of:
- comparing the current battery level to a predefined battery level threshold value; and
- selecting the current power mode for the mobile device based on a comparison such that the first power mode is selected when the current battery level exceeds the predefined battery level threshold value, and the second power mode is selected when the current battery level falls below the predefined battery level threshold value.

4. The data processing system of claim 1, wherein the memory further includes executable instructions that cause the data processing system to perform functions of:
- selecting a generative AI model of the AI system to use to generate the response for the prompt based on the current battery level using a model selection component of the adaptive AI control system, the generative AI model selected being one of a plurality of different generative AI models of the AI system capable of processing the prompt, each of the plurality of generative AI models having a different level of complexity; and
- providing an indication of the selected generative AI model to the AI system along with the prompt.

5. The data processing system of claim 4, wherein the prompt includes instructions for causing the AI system to perform a generative AI task, the generative AI task being one of a text generation task and an image generation task.

6. The data processing system of claim 5, wherein, when the generative AI task is the text generation task, the AI system includes a first text generative AI model for performing the text generation task when the current power mode is the first power mode and a second text generative AI model for performing the text generation task when the current power mode is the second power mode,
- wherein the first text generative AI model has a higher complexity than the second text generative AI model.

7. The data processing system of claim 5, wherein, when the generative AI task is the image generation task, the AI system includes a first image generative AI model for performing the image generation task when the current power mode is the first power mode and a second image generative AI model for performing the image generation task when the current power mode is the second power mode,
- wherein the first image generative AI model has a higher complexity than the second image generative AI model.

8. The data processing system of claim 5, wherein, when the generative AI task is a text summarization task and the current power mode is the second power mode, to modify the prompt the memory further includes executable instructions that cause the data processing system to perform a function of:
- modifying the prompt to include instructions for causing the AI system to generate an extractive summary.

9. The data processing system of claim 5, wherein, when the generative AI task is the image generation task, to modify the prompt the memory further includes executable instructions that cause the data processing system to perform a function of:

modifying the prompt to include instructions for causing the AI system to generate the response with a first resolution when the current power mode is a high power mode and a second resolution when the current power mode is a low power mode, the first resolution being higher than the second resolution.

10. A method for adapting generative artificial intelligence (AI) performance to improve battery usage efficiency on a mobile device, the method comprising:

receiving a prompt for an AI system from a user interface component of a software application, the AI system including at least one generative AI model;

determining a current battery level of the mobile device using a battery level monitoring component of an adaptive AI control system;

selecting a generative AI model of the AI system to use to generate a response for the prompt based on the current battery level using a model selection component of the adaptive AI control system, the generative AI model selected being one of a plurality of different generative AI models of the AI system capable of processing the prompt, each of the plurality of generative AI models having a different level of complexity;

selecting a current power mode for the mobile device based on the current battery level using a mode selection component of the adaptive AI control system, the current power mode being one of a high power mode and a low power mode;

modifying the prompt based on the current power mode using a prompt modification component of the adaptive AI control system, the prompt being modified to cause the AI system to generate a response to the prompt having a first complexity when the current power mode is the high power mode and a second complexity when the current power mode is the low power mode, the first complexity being higher than the second complexity; and providing the prompt and an indication of the selected generative AI model to the AI system.

11. The method of claim 10, wherein determining the current battery level further comprises:

using an Application Programming Interface (API) of the mobile device to monitor the current battery level of the mobile device.

12. The method of claim 10, wherein selecting the current power mode for the mobile device further comprises:

comparing the current battery level to a predefined battery level threshold value; and selecting the current power mode for the mobile device based on a comparison such that the high power mode is selected when the current battery level exceeds the predefined battery level threshold value, and the low power mode is selected when the current battery level falls below the predefined battery level threshold value.

13. The method of claim 12, wherein the prompt includes instructions for causing the AI system to perform a generative AI task, the generative AI task being one of a text generation task and an image generation task.

14. The method of claim 13, wherein, when the generative AI task is a text generation task, the AI system includes a first text generative AI model for performing the text generation task when the current power mode is the high power mode and a second text generative AI model for performing the text generation task when the current power mode is the high power mode, wherein the first text generative AI model has a higher complexity than the second text generative AI model.

15. The method of claim 13, wherein, when the generative AI task is the image generation task, the AI system includes a first image generative AI model for performing the image generation task when the current power mode is the high power mode and a second image generative AI model for performing the image generating task when the current power mode is the high power mode, wherein the first image generative AI model has a higher complexity than the second image generative AI model.

16. The method of claim 13, wherein, when the generative AI task is a text summarization task and the current power mode is the low power mode, modifying the prompt further comprises:

modifying the prompt to include instructions for causing the AI system to generate an extractive summary.

17. The method of claim 13, wherein, when the generative AI task is the image generation task, modifying the prompt further comprises modifying the prompt to include instructions for causing the AI system to generate the response with a first resolution when the current power mode is the high power mode and a second resolution when the current power mode is the low power mode, the first resolution being higher than the second resolution.

18. A non-transitory computer readable medium on which are stored instructions that, when executed, cause a programmable device to perform functions of:

receiving a prompt for an AI system from a user interface component of a software application on a mobile device, the AI system including at least one generative AI model;

determining a current battery level of the mobile device using a battery level monitoring component of an adaptive AI control system;

selecting a current power mode for the mobile device based on the current battery level using a mode selection component of the adaptive AI control system, the current power mode being one of a first power mode and a second power mode, the second power mode being lower than the first power mode;

modifying the prompt based on the current power mode using a prompt modification component of the adaptive AI control system, the prompt being modified to cause the AI system to generate a response to the prompt having a first complexity when the current power mode is the first power mode and a second complexity when the current power mode is the second power mode, the first complexity being higher than the second complexity;

selecting a generative AI model of the AI system to use to generate a response for the prompt based on the current battery level using a model selection component of the adaptive AI control system, the generative AI model selected being one of a plurality of different generative AI models of the AI system capable of processing the prompt, each of the plurality of generative AI models having a different level of complexity; and providing the prompt and an indication of the selected generative AI model to the AI system.

19. The non-transitory computer readable medium of claim 18, wherein selecting the current power mode for the mobile device further comprises:

comparing the current battery level to a predefined battery level threshold value; and selecting the current power mode for the mobile device based on a comparison such that a high power mode is selected when the current battery level exceeds the predefined battery level threshold value, and a low power mode is selected when the current battery level falls below the predefined battery level threshold value.

* * * * *